(12) United States Patent
DeLuca et al.

(10) Patent No.: US 11,335,335 B2
(45) Date of Patent: May 17, 2022

(54) DISAMBIGUATION OF GENERIC COMMANDS FOR CONTROLLING OBJECTS

(71) Applicant: International Business Machines Corporation, Armonk, NY (US)

(72) Inventors: Lisa Seacat DeLuca, Baltimore, MD (US); Zachary A. Silverstein, Jacksonville, FL (US); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/779,733

(22) Filed: Feb. 3, 2020

(65) Prior Publication Data

US 2021/0241756 A1 Aug. 5, 2021

(51) Int. Cl.
*G10L 15/22* (2006.01)
*G10L 15/18* (2013.01)

(52) U.S. Cl.
CPC .......... *G10L 15/1815* (2013.01); *G10L 15/22* (2013.01); *G10L 2015/223* (2013.01); *G10L 2015/228* (2013.01)

(58) Field of Classification Search
CPC .............. G10L 15/22–15/228; G10L 15/1815
USPC ...................................................... 704/275
See application file for complete search history.

(56) References Cited

U.S. PATENT DOCUMENTS

| 5,899,972 | A | 5/1999 | Miyazawa et al. |
| 8,296,383 | B2 * | 10/2012 | Lindahl ................... G06F 16/43 |
| | | | 709/206 |
| 9,734,839 | B1 * | 8/2017 | Adams ..................... G10L 21/00 |
| 10,049,663 | B2 * | 8/2018 | Orr ...................... G10L 15/1815 |
| 2003/0216919 | A1 | 11/2003 | Roushar |
| 2008/0091426 | A1 | 4/2008 | Rempel et al. |
| 2008/0301135 | A1 | 12/2008 | Alves et al. |
| 2012/0265528 | A1 * | 10/2012 | Gruber ................... G10L 15/183 |
| | | | 704/235 |
| 2014/0278435 | A1 | 9/2014 | Ganong, III et al. |

(Continued)

OTHER PUBLICATIONS

R Budiu, et al., "Intelligent Assistants Have Poor Usability: A User Study of Alexa, Google Assistant, and Siri", Jul. 22, 2018, Nielsen Norman Group, 22 pages.

(Continued)

*Primary Examiner* — Abul K Azad
(74) *Attorney, Agent, or Firm* — Edell, Shapiro & Finnan, LLC

(57) ABSTRACT

A computer system performs an action on an object identified from a command. A command is analyzed to perform an action on a target object, wherein the command includes a term for the target object that refers to a plurality of different candidate objects. The target object is identified from the plurality of different candidate objects based on historical associations of the term with specific ones of the candidate objects, recent interactions with the different candidate objects, and a state of the candidate objects provided by network devices. The action is performed on the identified target object. Embodiments of the present invention further include a method and program product for performing an action on an object identified from a command in substantially the same manner described above.

20 Claims, 5 Drawing Sheets

(56) References Cited

U.S. PATENT DOCUMENTS

| | | |
|---|---|---|
| 2014/0297284 A1 | 10/2014 | Gruber et al. |
| 2015/0348547 A1* | 12/2015 | Paulik .................. G10L 15/197 704/251 |
| 2018/0122378 A1 | 5/2018 | Mixter et al. |
| 2019/0005960 A1 | 1/2019 | Naravanekar |
| 2020/0302925 A1* | 9/2020 | Shah ....................... G10L 15/22 |

OTHER PUBLICATIONS

J. Mccormick, "Predictions 2017: Artificial Intelligence Will Drive The Insights Revolution", Nov. 2, 2016, Forrester Research for Customer Insights Professionals, 9 pages.

"Intelligent Virtual Assistant Market: Global Industry Trends, Share, Size, Growth, Opportunity and Forecast 2018-2023", https://www.researchandmarkets.com/reports/4775648/intelligent-virtual-assistant-market-global, Jul. 23, 2018, 3 pages.

H. Jeon, et al., "An Intelligent Dialogue Agent for the IoT Home", The Workshops of the Thirtieth AAAI Conference on Artificial Intelligence, Artificial Intelligence Applied to Assistive Technologies and Smart Environments: Technical Report WS-16-01, Mar. 2016, 6 pages.

* cited by examiner

DISAMBIGUATION OF GENERIC COMMANDS FOR CONTROLLING OBJECTS

BACKGROUND

1. Technical Field

Present invention embodiments relate to performing actions using a virtual agent, and more specifically, to disambiguating generic commands to a virtual agent to perform desired actions.

2. Discussion of the Related Art

A virtual agent is a software agent that can perform tasks or services for an individual based on provided questions or commands. Virtual agents may be integrated with virtual objects, such as a user's schedule, as well as physical objects, such as a smart thermostat or television. When interacting with a virtual agent, a degree of specificity may be required in order to identify items. For example, a user's reference to "the door" or "the text message" may not be specific enough to identify a particular item.

SUMMARY

According to one embodiment of the present invention, a computer system performs an action on an object identified from a command. A command is analyzed to perform an action on a target object, wherein the command includes a term for the target object that refers to a plurality of different candidate objects. The target object is identified from the plurality of different candidate objects based on historical associations of the term with specific ones of the candidate objects, recent interactions with the different candidate objects, and a state of the candidate objects provided by network devices. The action is performed on the identified target object. Embodiments of the present invention further include a method and computer program product for performing an action on an object identified from a command in substantially the same manner described above.

BRIEF DESCRIPTION OF THE DRAWINGS

Generally, like reference numerals in the various figures are utilized to designate like components.

DETAILED DESCRIPTION

Figure 1:
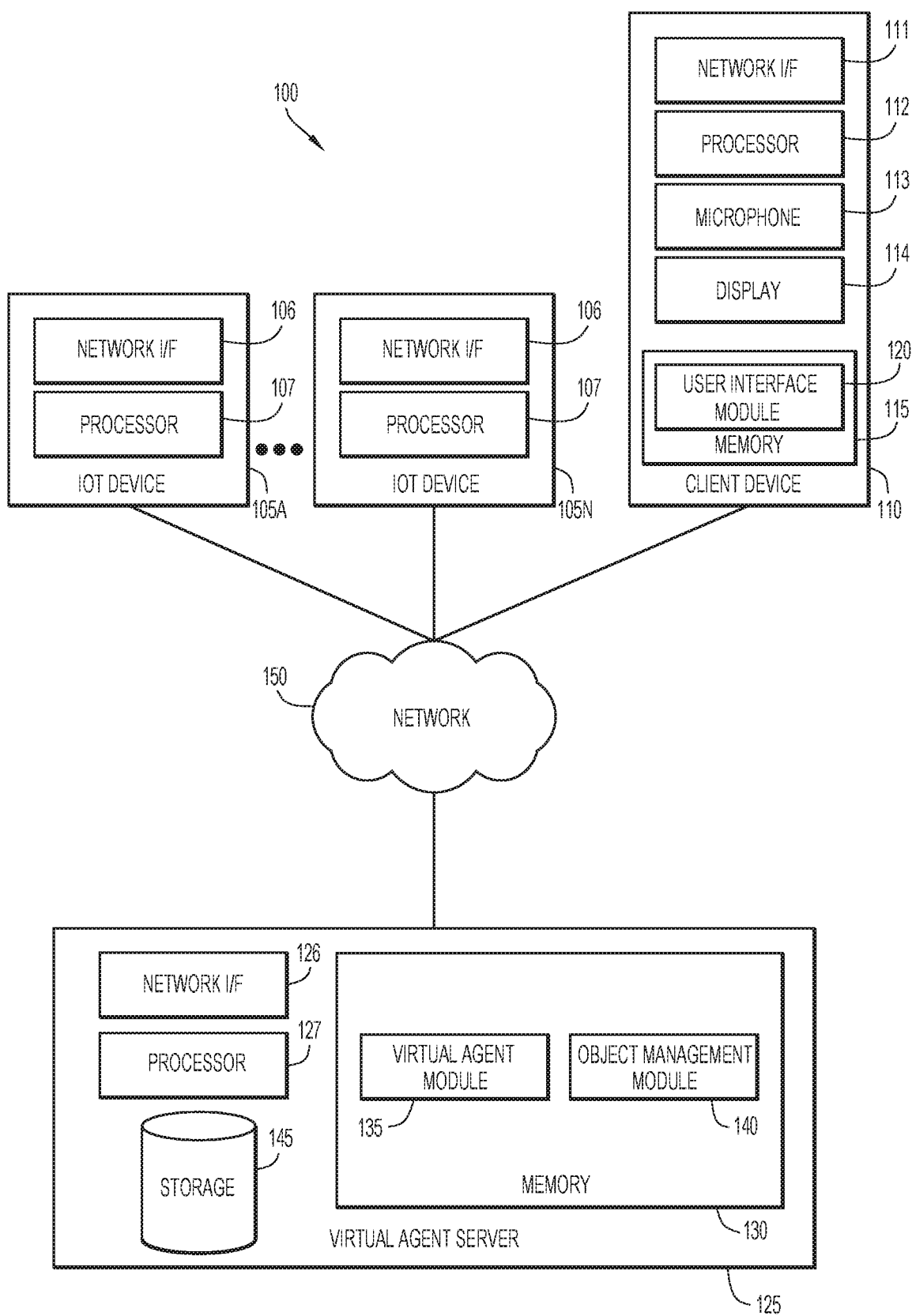
FIG. 1 is a block diagram depicting a computing environment for disambiguating generic commands to a virtual agent to perform desired actions in accordance with an embodiment of the present invention.

Present invention embodiments relate to performing actions using a virtual agent, and more specifically, to disambiguating generic commands to a virtual agent to perform desired actions. A virtual agent may struggle to interpret generic commands, as such commands could reference multiple objects. For example, when a user instructs a virtual agent to "turn on the television," the virtual agent may lack the context necessary to determine whether to turn on the living room television, the bedroom television, etc.

Name resolution refers to the process of determining the target object that is referenced by one or more terms in a user-provided command. In order to perform proper name resolution, present invention embodiments utilize an ontology tree into which a user's virtual and/or physical objects are assigned. An ontology tree may be descended from a general level to a specific level, and data associated with Internet-of-Things (IoT) devices can be ingested to enable targeted descent of the ontology tree. In particular, the target object of a generic command can be determined by comparing candidate objects in the ontology tree based on the historical associations between one or more terms in the generic command and objects, based on recent interactions with different candidate objects, and/or based on a current state or status of the candidate objects. For example, if a user typically refers to the living room television as "the TV," then the living room television may be associated with that command. Similarly, if a user has recently interacted with an object, a subsequent generic command can be interpreted as likely referring to that same object. The state of an object can also be considered: if a television is already on, a command to "turn on the TV" may be interpreted as referencing another television.

Thus, present invention embodiments provide a score for each candidate object in an ontology tree that is based on weights applied to various factors associated with each object, and the ontology tree can be navigated to select a target object by comparing the scores of the various candidate objects. By disambiguating generic commands, a virtual agent can more effectively and quickly provide services to a user. Present invention embodiments enable a virtual agent to interpret generic commands that may otherwise not be interpretable, thereby providing a more sophisticated degree of control and responsiveness to a virtual agent.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for disambiguating generic commands to a virtual agent to perform desired actions in accordance with an embodiment of the present invention. As depicted, computing environment 100 includes one or more IoT devices 105A-105N, a client device 110, a virtual agent server 125, and a network 150. It is to be understood that the functional division among components of computing environment 100 have been chosen for purposes of explaining present invention embodiments and is not to be construed as a limiting example.

Each IoT device 105A-105N includes a network interface (I/F) 106 and at least one processor 107. As the Internet of Things refers to a system of interrelated computing devices, mechanical and digital machines, objects, animals or people that are provided with unique identifiers and have the ability to transfer data over a network, IoT devices 105A-105N can include any IoT-enabled entity. For example, IoT devices 105A-105N may include automation devices (e.g., smart window blinds, a smart heating, ventilation, and air conditioning (HVAC) system, a smart refrigerator, etc.), entertainment devices (e.g., televisions, sound systems, smart speakers, etc.), or other computing devices (e.g., media servers, laptops, desktops, security systems, webcams, teleconferencing equipment, etc.). IoT devices 105A-105N are remotely-controllable by a virtual agent; when a user issues a command to the virtual agent, the virtual agent may cause a selected IoT device to execute a specified action. Each IoT device 105A-105N may transmit information pertaining to the identity of the IoT device, such as a device type, make, manufacturer, and the like. For example, IoT device 105A may transmit data or metadata indicating that IoT device 105A is, e.g., a smart television, and IoT device 105N may similarly advertise that IoT device 105N is, e.g., a smart HVAC system. IoT devices 105A-105N may identify themselves using a hostname, Internet Protocol (IP) address, media access control (MAC) address, device identifier, or other identifying information. In some embodiments, an IoT device 105 provides identifying information in response to a request from virtual agent server 125.

Client device 110 includes a network interface (I/F) 111, at least one processor 112, a microphone 113, a display 114, and memory 115 with a user interface module 120. Client device 110 may include a smart speaker, a laptop computer, a tablet computer, a netbook computer, a personal computer (PC), a desktop computer, a personal digital assistant (PDA), a smart phone, a thin client, or any programmable electronic device capable of executing computer readable program instructions. Network interface 111 enables components of client device 110 to send and receive data over a network, such as network 150. In general, a user may provide commands (e.g., verbal or voice, text, etc.) to client device 110 in order to control physical objects (e.g., IoT devices 105A-105N) and/or virtual objects (e.g., calendar entries, applications on a computing device, etc.). Client device 110 may include internal and external hardware components, as depicted and described in further detail with respect to FIG. 5.

Microphone 113 may include any device that converts sound into a signal. A user of client device 110 may provide voice commands to client device 110 via microphone 113. For example, a user may utter a statement such as "turn off the lights," which is collected as audio data by microphone 113 for processing (e.g., by virtual agent server 125 and/or its modules) to determine an appropriate action to be undertaken based on the voice command.

Display 114 may include any electronic device capable of presenting information in a visual form. For example, display 114 may be a liquid crystal display (LCD), a cathode ray tube (CRT) display, a light-emitting diode (LED) display, an electronic ink display, and the like. Information relating to controlling virtual and/or physical objects via user-provided commands may be presented to a user of client device 110 via display 114. For example, display 114 may enable a user to input or review a text command, select a command from one or more default or customized options, and the like.

User interface module 120 may include one or more modules or units to perform various functions of present invention embodiments described below. User interface module 120 may be implemented by any combination of any quantity of software and/or hardware modules or units, and may reside within memory 115 of client device 110 for execution by a processor, such as processor 112.

User interface module 120 enables a user to access a virtual agent in order to provide commands to control virtual and/or physical objects. User interface module 120 may provide a graphical user interface via display 114 in order to facilitate user input of commands to client device 110. Additionally or alternatively, user interface module 120 may include a voice command-based user interface through which a user may issue commands. For example, a user may utter a trigger phrase (e.g., "hey, virtual agent!") to indicate that the user is about to verbally issue a command (e.g., "turn on the air conditioning"). User interface module 120 may provide audio feedback to indicate that a virtual agent is listening or performing a requested command. When a command is provided by a user, user interface module 120 may pass the command to virtual agent server 125 and its modules for processing.

Virtual agent server 125 includes a network interface (I/F) 126, at least one processor 127, memory 130, and storage 145. Memory 130 includes a virtual agent module 135 and an object management module 140. Virtual agent server 125 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 126 enables components of virtual agent server 125 to send and receive data over a network, such as network 150. In general, virtual agent server 125 processes user commands to control, modify, or otherwise cause actions to virtual and/or physical objects. When a command could refer to multiple objects, virtual agent server 125 disambiguates the command to determine a target object. Virtual agent server 125 may include internal and external hardware components, as depicted and described in further detail with respect to FIG. 5.

It should be appreciated that computing environment 100 provides only an illustration of one embodiment and does not imply any limitations with regard to the environments in which different embodiments may be implemented. Many modifications to the depicted environment may be made. In particular, virtual agent server 125 and/or its modules may be included in client device 110 to provide virtual agent functionality that is partially or fully local to client device 110.

Virtual agent module 135 and object management module 140 may include one or more modules or units to perform various functions of present invention embodiments described below. Virtual agent module 135 and object management module 140 may be implemented by any combination of any quantity of software and/or hardware modules or units, and may reside within memory 130 of virtual agent server 125 for execution by a processor, such as processor 127.

Virtual agent module 135 provides a virtual agent for causing the execution of actions in response to user commands. Virtual agent module 135 may apply known or other natural language processing techniques in order to determine an action to be performed based on a user's command. For voice commands, virtual agent module 135 may initially perform voice-to-text processing to output a text representation of the user's voice command. Virtual agent module 135 may process a user command using techniques such as latent dirichlet allocation, biterm topic modeling, and the like, to perform topic analysis in order to identify the term or terms in the command that refer to the target object of a user's command. Additionally, virtual agent module 135 may process a command to identify an action to be performed by, or applied to, the identified target object.

Virtual agent module 135 identifies a target object based on a term in a command that refers to physical and/or virtual objects. In particular, virtual agent module 135 may navigate an ontology tree of objects until an object can be selected that matches the term associated with a target object. Virtual agent module 135 may also include synonyms of the term when searching an ontology tree. An ontology tree is an ontological hierarchy into which physical and/or virtual objects within a user's purview of control may be arranged. In particular, object management module 140 may register or authenticate a user's physical and/or virtual objects with a virtual agent, and may form an ontology tree into which registered or authenticated objects are organized.

When a target object is identified, virtual agent module 135 may transmit instructions to cause the target object to perform the action included in the user command. Virtual agent module 135 may transmit instructions to target objects, including virtual and physical objects, via one or more Application Programming Interfaces (APIs). However, when a user command includes a generic term for an object that can refer to multiple candidate objects in the ontology tree, virtual agent module 135 may disambiguate the term by analyzing candidate objects in order to identify a target object.

In particular, virtual agent module 135 may select a target object from two or more candidate objects by analyzing historical associations of the term in the command with specific candidate objects, by analyzing recent interactions with the different candidate objects, and by analyzing a state of the candidate objects. Historical associations may include previous instances in which a user used a same or similar term to refer to a specific object. For example, if a user has previously referred to a television in the living room as "the TV," the term "the TV" may be associated with the living room television (virtual agent module 135 can initially learn such associations by posing follow-up questions to a user, such as "did you mean the living room television or the bedroom television?" and the like). Historical associations may also include an object that has been the target of the greatest number of commands. For example, when a user's commands are targeted at the user's smart television more than the user's desktop computer, virtual agent module 135 may select the smart television as the target object.

Recent interactions may include any objects with which a user has recently interacted, either within a particular threshold of time, or relative to interactions with other objects. Analyzing a state of candidate objects may include determining whether the action portion of a user command presents a logical conflict in a current operational state of a device. For example, given the command of "turn on the fan," the action conflicts with any fans that are already activated, so virtual agent module 135 may select as a target object a fan that is in a deactivated state. Similarly, virtual agent module 135 may not select as a target object any devices incapable of performing the requested action.

In some embodiments, virtual agent module 135 selects a target object among two or more candidate objects by analyzing a user's position in an area. In particular, virtual agent module 135 may perform image processing on image data that is captured by an image capture device (which may be implemented by, e.g., any of IoT devices 105A-105N). A user's proximity to candidate objects may thus be considered when selecting a target object. For example, when a user says "turn on the TV," virtual agent module 135 may turn on a television in a room currently inhabited by the user.

In some embodiments, virtual agent module 135 employs crowdsourcing analysis to select a target object in response to a generic command. By analyzing crowdsourced responses from other users with similar devices, generic commands can be associated with objects that other users intend same or similar generic commands to reference.

Object management module 140 maintains an ontology tree of a user's physical and/or virtual objects that a virtual agent is authorized to access or control. Object management module 140 may organize each IoT device 105A-105N into an ontology tree based on identification information of the IoT devices 105A-105N, and may similarly organize virtual objects, such as calendar entries or other user data, into the ontology tree.

In some embodiments, information used for analyzing each candidate object is associated with a specific name or identifier of the candidate object and/or the candidate object's location in the ontology tree, and is stored in a decaying storage object that decays over time. The information stored in the decaying storage object may include information for the candidate object collected from prior user commands. Thus, a target object can be identified as relevant based on recent information, and as the information in the decaying storage object decays over time, the information may be treated as less relevant. Decay can be quantified as a numerical score that decreases over time, and candidate objects with higher scores may be preferred as target objects over candidate objects with lower scores. The score for each object can be based on one or more factors, such as the historical association of a term with a candidate object, recent interactions with a candidate object, and a state of a candidate object. An overall or composite score can be determined based on the factors, and weights may be applied to various factors in determining the overall score for a candidate object.

A score representing the historical association of a term with a candidate object may decay based on the historical frequency of introduction or removal of the same and/or similar objects. Thus, as a user adds or removes access to computing environment 100 (e.g., by registering/deregistering IoT devices 105A-105N with object management module 140, adding or removing virtual objects, etc.), the association of a term to a candidate object may decay over time. For example, if the command "turn on the radio" usually refers to the living room radio, and the user has added other devices with radio functionality, the strength of the association between the term "the radio" and the living room radio decays.

A score representing the recent interactions with a candidate object may decay based on how recently a user has interacted with the candidate object. The score may be reset to a default value or increased in magnitude whenever a user interacts with the candidate object, and may decay over time as a user does not interact with the candidate object. A user interaction may be initiated via virtual agent module 135 or a user may manually interact with the candidate object (e.g., via buttons, remote controllers, wall switches, or other input devices). Different objects may decay at different rates; for example, an interaction involving a text message may decay in five minutes, whereas an interaction with a lighting system may decay in an hour. Decay may include removal or omission of information relating to an object and/or reduction of a score associated with an object. For example, a total score or sub-score may decay a predetermined amount whenever a time period elapses. Some scores may decay by a factor of itself each time period; for example, a score may decay by half every twenty minute, by one-fourth every four months, etc.

A score representing a state of a candidate object may decay based on a contextual component derived from a state of the candidate object. The score may be set to a default value or modified whenever a user-issued command causes an object to be placed into a particular state, and may decay over time as long as there is no subsequent command to change the state of the candidate object stays in that state. Additionally or alternatively, the score may be reduced when the particular state of a candidate object is changed. For example, when a user command may cause a television to enter a state in which the volume is muted, the score for that state of the television may be set to a value indicating that it is unlikely that a subsequent command to mute a device would be directed at that television.

Storage 145 may include any non-volatile storage media known in the art. For example, storage 145 can be implemented with a tape library, optical library, one or more independent hard disk drives, or multiple hard disk drives in a redundant array of independent disks (RAID). Similarly, data in storage 145 may conform to any suitable storage architecture known in the art, such as a file, a relational database, an object-oriented database, and/or one or more tables. In some embodiments, storage 145 may store data relating to physical and/or virtual objects, ontology trees of objects and associated metadata (including scores for objects and/or decay information), previous user command history, crowdsourced data, and the like.

Network 150 may include a local area network (LAN), a wide area network (WAN) such as the Internet, or a combination of the two, and includes wired, wireless, or fiber optic connections. In general, network 150 can be any combination of connections and protocols known in the art that will support communications between IoT devices 105A-105N, client device 110, and/or virtual agent server 125 via their respective network interfaces in accordance with embodiments of the present invention.

In one example, a user may provide a command requesting a virtual agent to "turn off the TV." However, virtual agent module 135 may determine that there are three possible matches in the ontology tree (e.g., a living room television, a game room television, and a bedroom television), so historical associations of the term and candidate objects, recent interactions with the candidate objects, and states of the candidate objects are analyzed. Virtual agent module 135 may determine that historically, "the TV" correlates to the living room television. Moreover, the user may have recently interacted with the living room television, and/or the state of the living room television may be on, whereas the other two televisions are both off. Thus, virtual agent module 135 would select the living room television as the target object of the user's command to "turn off the TV."

Figure 2:
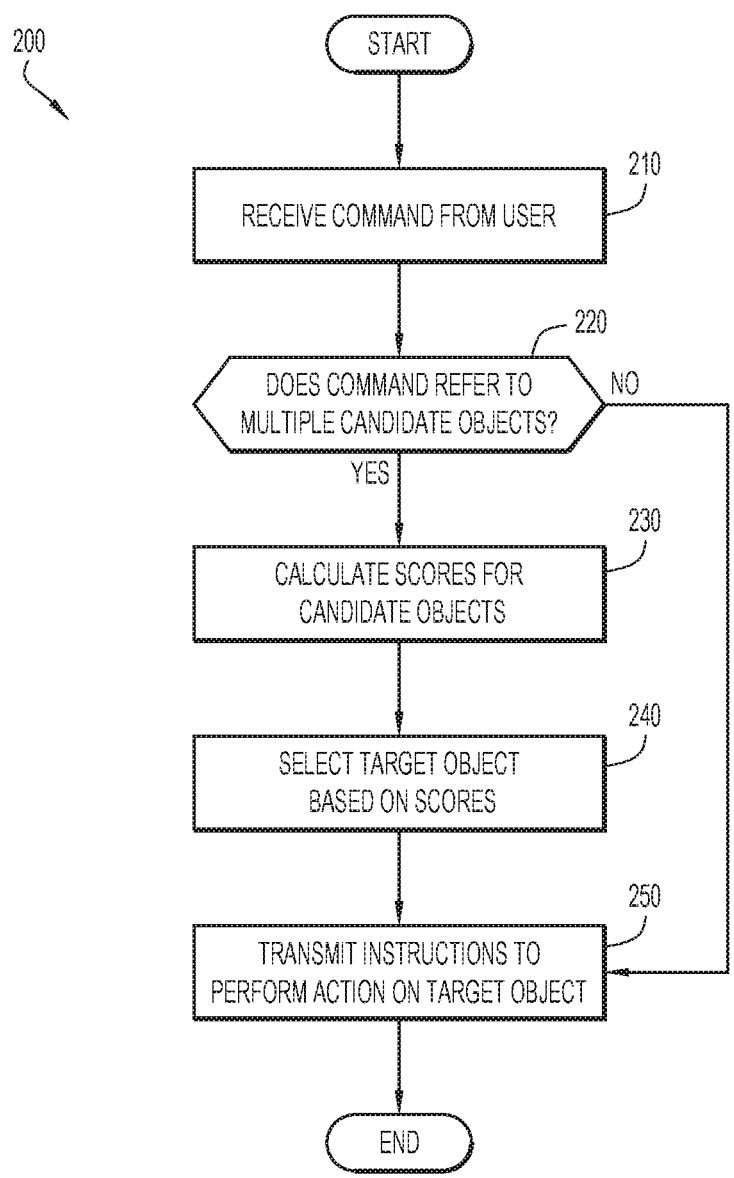
FIG. 2 is a flow chart depicting a method of disambiguating generic commands to a virtual agent to perform desired actions in accordance with an embodiment of the present invention.

FIG. 2 is a flow chart depicting a method 200 of disambiguating generic commands to a virtual agent to perform desired cations in accordance with an embodiment of the present invention.

A command is received from a user at operation 210. A user of client device 110 may provide a verbal command via microphone 113 or may input a command to user interface module 120. A received command may be transmitted to virtual agent server 125 for processing. In some embodiments, multiple virtual agents may be provided, and virtual agent server 125 may select a virtual agent based on the user's command, including the target object and/or the requested action.

Operation 220 determines whether the command refers to multiple candidate objects. Virtual agent module 135 queries an ontology tree, maintained by object management module 140, to determine if a specific target object indicated by a term of the command can be identified. However, virtual agent module 135 may not be able to identify a specific object indicated in a command if there are too many items in the ontology tree, the term is too vague, or multiple objects could match the command due to vague or synonymous names. If the command includes enough specificity to indicate a particular target object, instructions are transmitted to the target object to perform the requested action at operation 250.

If the command does not include enough specificity to indicate a particular target object, candidate objects are identified and scores for the candidate objects are calculated at operation 230. As virtual agent module 135 descends an ontology tree, some objects can be ruled out, leaving other objects to be candidate objects. For example, if a user requests a physical action to be take, such as turning on or off a device, virtual agent module 135 can omit virtual objects, such as entries in a user's calendar.

A score for each candidate object can be based on one or more factors, such as the historical association of a term with a candidate object, recent interactions with a candidate object, and a state of a candidate object. In some embodiments, the factors can be assigned various weights, and in some embodiments, the values for one or more factors may decay over time. Virtual agent module 135 may determine a composite score for each candidate object based on one or more of the factors by analyzing information maintained by object management module 140. The composite score may reflect sub-scores of the various factors, and may be include a sum, an average (including a weighted average), or any other representation.

A target object is selected based on the scores at operation 240. Virtual agent module 135 may compare scores of candidate objects and select a target object based on its score (e.g., the candidate object having a highest score, a lowest score, a score closest to a predetermined value, etc.). Instructions are transmitted to the target object to perform the action requested by the user at operation 250. The action may include any requested action that the target object is capable of performing, including changing a state of a device, adding or removing a calendar entry, generating and sending a communication, etc. In some embodiments, an action may include activating or deactivating parental controls on a target device.

In one example, a user may receive an email relating to a dental appointment in the next week. The user may request that a virtual agent read the email to him (e.g., via client device 110). Furthermore, the user may also have a dermatologist appointment in his calendar for the following day. Later, the user may receive a message requesting a meeting with a customer, which would conflict with his dental appointment, so the user provides a command to the virtual agent to "cancel my doctor's appointment." When virtual agent module 135 navigates the ontology tree associated with the user's objects, there are two candidate objects: the dental appointment for Thursday, and the dermatologist appointment for Friday. Thus, virtual agent module 135 calculates scores for each candidate object. For the dental appointment, the historic feedback score may be 0.2 (a low score because the term "doctor's appointment" is not commonly used for a dental appointment), the recent interaction score may be 0.9 (a high score because the user recently read an email pertaining to the dental appointment), and the object state score may be 0.7 (a medium score because there is a potential conflict between the virtual object of the dental appointment on the user's calendar and the meeting with the customer), resulting in a total score of 1.8 and a mean score of 0.6. For the dermatologist appointment, the historic feedback score may be 0.8 (because the term "doctor's appointment" is very synonymous with a dermatologist appointment), the recent interaction score may be 0.1 (because the user last read an email about the dermatologist appointment a month ago, so the score has decayed over time), and the object state score may be 0.3 (because it is unlikely that the user will have a scheduling conflict based on the user's actual calendar entries and/or previous activity), resulting in a total score of 1.2 and a mean score of 0.4. Thus, virtual agent module 135 may select the dental appointment as the target object, since the score is higher (in various embodiments, different methods of combining scores to arrive at a composite score may be used, such as averaging scores, summing scores, and the like.). Once the dental appointment is selected as the target object, virtual agent module 135 performs the requested action (e.g., canceling the dental appointment by generating and sending a cancellation email to the dental office).

Figure 3:
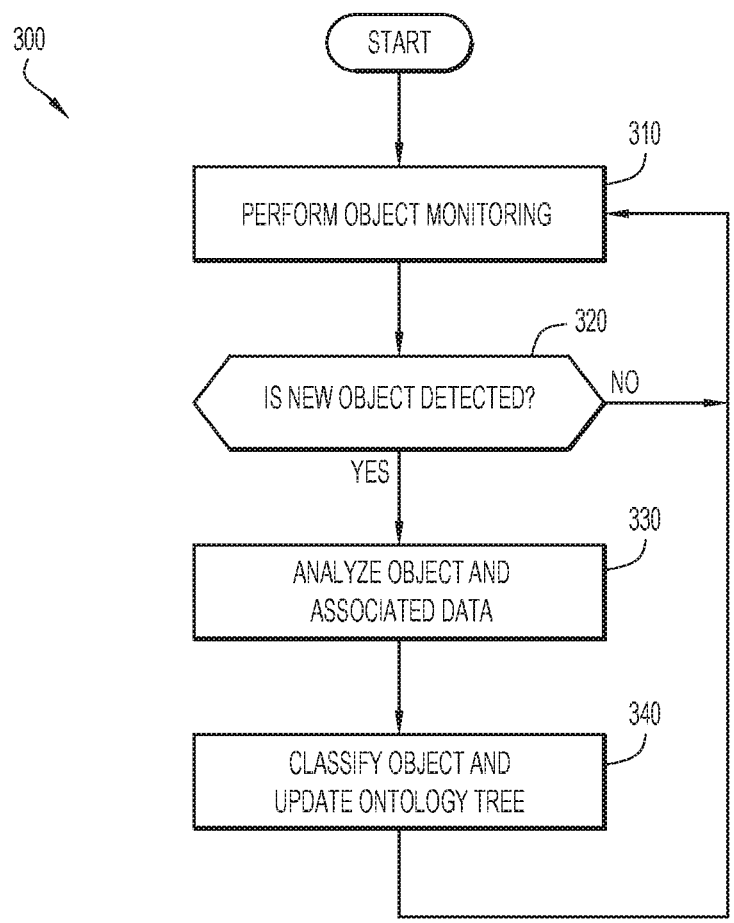
FIG. 3 is a flow chart depicting a method of determining an ontological classification for an object in accordance with an embodiment of the present invention.

FIG. 3 is a flow chart depicting a method 300 of determining an ontological classification for an object in accordance with an embodiment of the present invention.

Object monitoring is performed at operation 310. Object management module 140 may monitor for any objects associated with a user and/or a user's virtual agent(s). For example, whenever a user authenticates or registers a device or account with a virtual agent, object management module 140 may detect the change and identify the new object.

Operation 320 determines whether a new object has been added. If not, object management module 140 continues to monitor for new objects at operation 310. If a new object has been detected, object management module 140 analyzes the new object and any data or metadata associated with the object at operation 330. The detected object may include a physical object (e.g., IoT devices 105A-105N) and/or a virtual object (e.g., a calendar entry, email, etc.) Data collected by object management module 140 may include any identifier of an object, such as a device type, model or manufacturer information, or any other relevant information.

The object is classified and the ontology tree is updated at operation 340. Object management module 140 may classify the object as a physical or virtual object, and may select a node of an ontology tree that describes the object based on the object's associated data and metadata. The ontology tree is then updated to include the new object, and object management module 140 may continue to perform object monitoring at operation 310.

Figure 4:
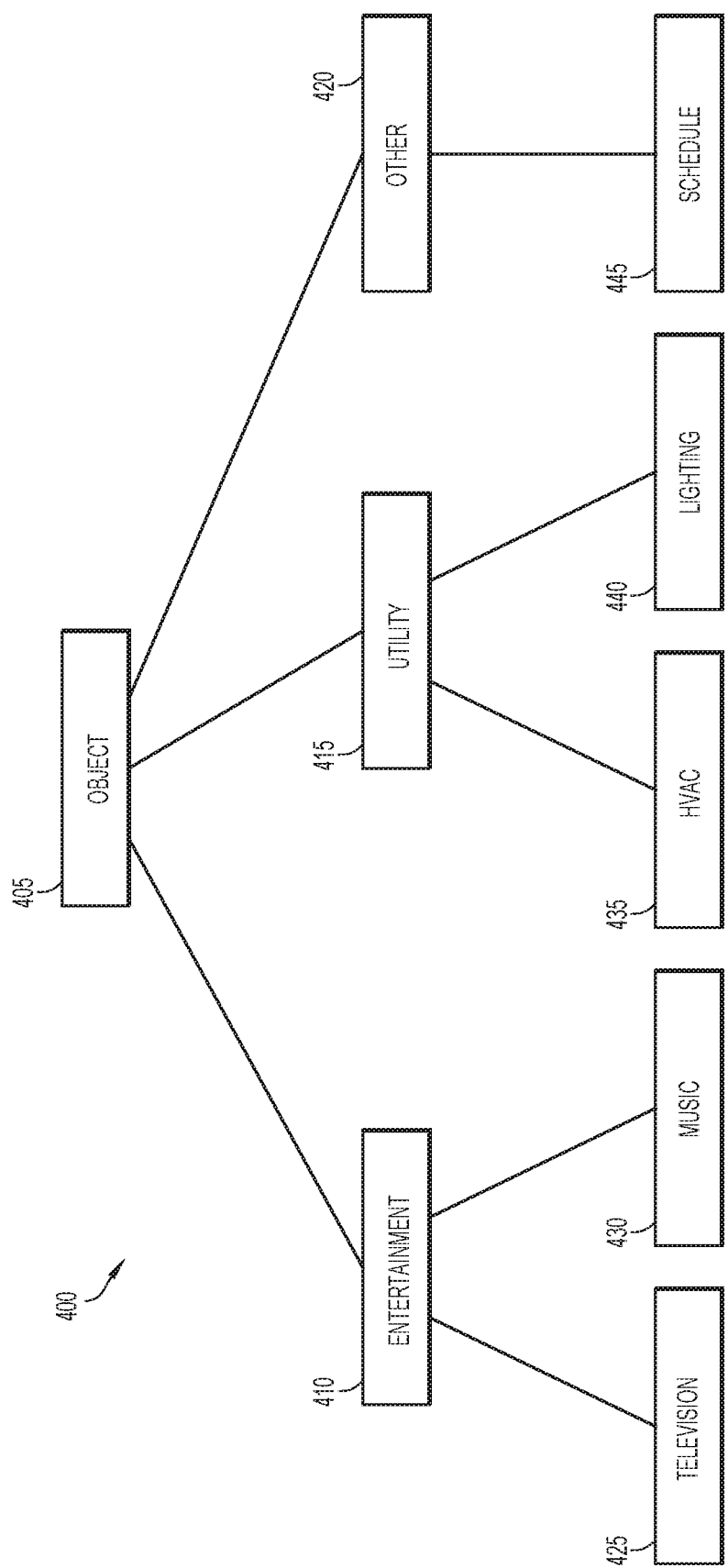
FIG. 4 is a block diagram depicting an ontology tree in accordance with an embodiment of the present invention.

FIG. 4 is a block diagram depicting an ontology tree 400 in accordance with an embodiment of the present invention. As depicted, ontology tree 400 is an ontological hierarchy of multiple layers, with objects in each descending layer increasing in specificity. At the uppermost level, object node 405 describes all objects. Entertainment node 410 includes entertainment-related objects, such as television node 425 and music node 430. For example, smart televisions may be placed under television node 425, and sound systems may be placed under music node 430. Utility node 415 includes utilities, such as home automation devices: as such, HVAC node 435 includes objects relating to the heating, cooling, and air conditioning of an area, and lighting node 440 may include objects relating to interior and/or exterior illumination. Other node 420 may provide a catch-all category, and may include virtual objects. For example, schedule node 445 may include the various entries in a user's calendar. Thus, using ontology tree 400, if a user requests to "turn on a TV," virtual agent module 135 may perform natural language processing to select as candidate objects any objects assigned under television node 425.

Figure 5:
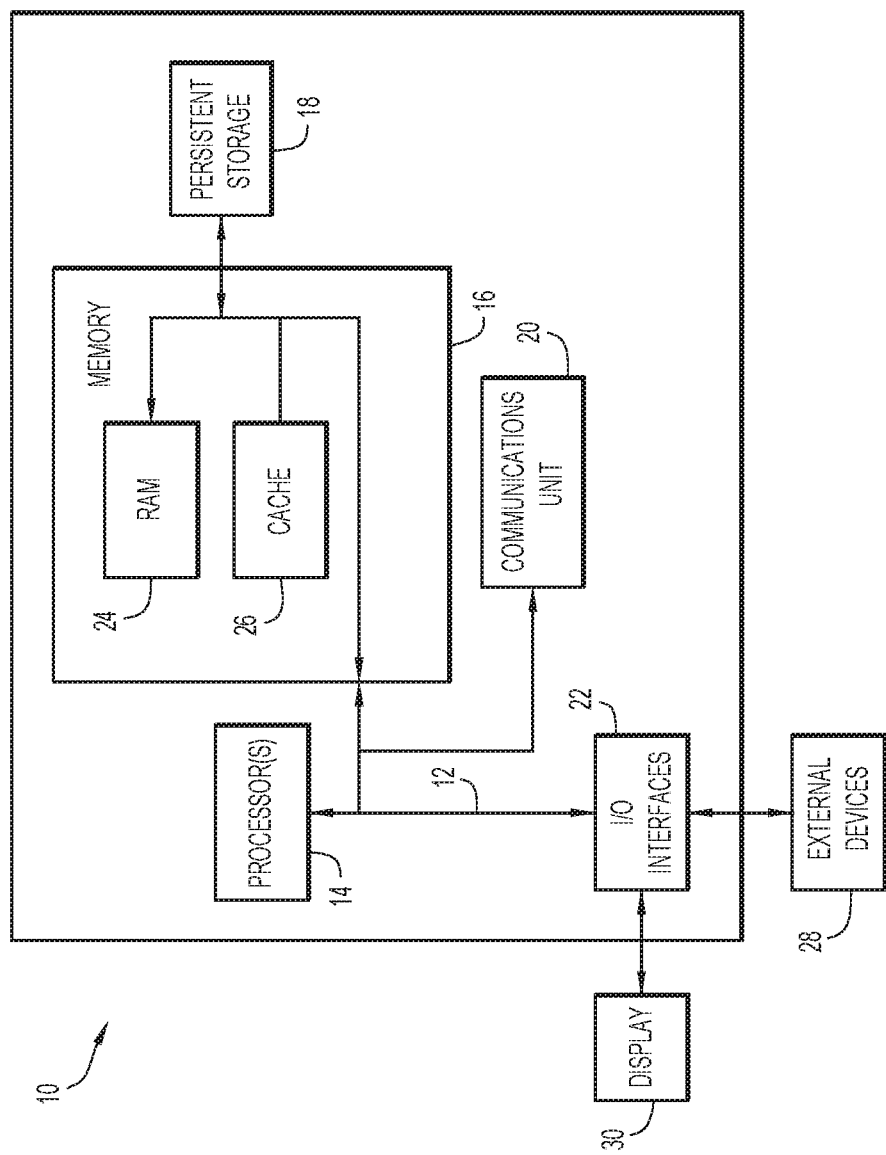
FIG. 5 is a block diagram depicting a computing device in accordance with an embodiment of the present invention.

FIG. 5 is a block diagram depicting components of a computer 10 suitable for executing the methods disclosed herein. Computer 10 may implement IoT devices 105A-105N, client device 110, and/or virtual agent server 125 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to disambiguating generic commands for controlling objects (e.g., user command history, physical and/or virtual object data and metadata, ontology tree data, scores for objects and/or decay information, crowdsourced data, etc.) may be stored within any conventional or other data structures (e.g., files, arrays, lists, stacks, queues, records, etc.) and may be stored in any desired storage unit (e.g., database, data or other repositories, queue, etc.). The data transmitted between IoT devices 105A-105N, client device 110, and/or virtual agent server 125 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to disambiguating generic commands for controlling objects (e.g., user command history, physical and/or virtual object data and metadata, ontology tree data, scores for objects and/or decay information, crowdsourced data, etc.) may include any information provided to, or generated by, IoT devices 105A-105N, client device 110, and/or virtual agent server 125. Data relating to disambiguating generic commands for controlling objects may include any desired format and arrangement, and may include any quantity of any types of fields of any size to store any desired data. The data relating to disambiguating generic commands for controlling objects may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to disambiguating generic commands for controlling objects), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of disambiguating generic commands for controlling objects.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, user interface module 120, virtual agent module 135, object management module 140, etc.). These systems may include any types of monitors and input devices (e.g., keyboard, mouse, voice recognition, etc.) to enter and/or view information.

It is to be understood that the software (e.g., communications software, server software, user interface module 120, virtual agent module 135, object management module 140, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, user interface module 120, virtual agent module 135, object management module 140, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to disambiguating generic commands for controlling objects). The database system may be implemented by any number of any conventional or other databases, data stores or storage structures (e.g., files, databases, data structures, data or other repositories, etc.) to store information (e.g., data relating to disambiguating generic commands for controlling objects). The database system may be included within or coupled to the server and/or client systems. The database systems and/or storage structures may be remote from or local to the computer or other processing systems, and may store any desired data (e.g., data relating to disambiguating generic commands for controlling objects).

The present invention embodiments may employ any number of any type of user interface (e.g., Graphical User Interface (GUI), command-line, prompt, etc.) for obtaining or providing information (e.g., data relating to disambiguating generic commands for controlling objects), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, processing ambiguous or generic commands to determine and perform actions requested by users.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of performing an action on an object identified from a command, the computer-implemented method comprising:
analyzing, via a processor, a command to perform an action on a target object, wherein the command includes a term for the target object that refers to a plurality of different candidate objects, wherein at least two of the different candidate objects include different physical objects;
identifying, via the processor, the target object from the plurality of different candidate objects based on historical associations of the term with specific ones of the candidate objects, recent interactions within a threshold amount of time with the different candidate objects, and a state of each of the candidate objects provided by one or more network devices; and
performing, via the processor, the action on the identified target object.

2. The method of claim 1, wherein the one or more network devices include an Internet of Things device.

3. The method of claim 1, wherein the target object incudes a virtual object.

4. The method of claim 1, wherein the command includes a voice command, and the processor implements a virtual agent to perform the action on the target object.

5. The method of claim 4, wherein the plurality of different candidate objects referred to by the term are determined from a decision ontology for the virtual agent.

6. The method of claim 1, further comprising:
determining, via the processor, a score for each of the plurality of different candidate objects based on weights applied to the historical association of the term with that candidate object, recent interactions with that candidate object, and the state of that candidate object provided by the network devices; and
identifying, via the processor, the target object from the plurality of candidate objects based on the score for each of the plurality of different candidate objects.

7. The method of claim 1, wherein identifying the target object further comprises:
identifying the target object based on crowdsourcing associations between the term and the plurality of candidate objects.

8. The method claim 1, further comprising:
identifying a virtual agent from among a plurality of different virtual agents to process the command based on the target object and action.

9. The method of claim 1, further comprising:
storing information for a specific object from a prior command in a decaying storage object, wherein the decaying storage object is used to identify the target object, and wherein a time decay for the decaying storage object is based on one or more from a group of:

a recent interaction with a network device referencing the specific object;

a historical frequency of introduction of other similar named objects; and a contextual component of network devices derived from a state of the specific object.

10. The method of claim 1, wherein the historical associations include a candidate object with a greatest quantity of commands, and the state of the candidate objects include presence of a conflict between an operational state of the candidate objects and the action to be performed on the target object.

11. The method of claim 1, wherein the action to be performed includes parental controls for the target object.

12. A computer system for performing an action on an object identified from a command, the computer system comprising:

one or more computer processors;

one or more computer readable storage media;

program instructions stored on the one or more computer readable storage media for execution by at least one of the one or more computer processors, the program instructions comprising instructions to:

analyze a command to perform an action on a target object, wherein the command includes a term for the target object that refers to a plurality of different candidate objects, wherein at least two of the different candidate objects include different physical objects;

identify the target object from the plurality of different candidate objects based on historical associations of the term with specific ones of the candidate objects, recent interactions within a threshold amount of time with the different candidate objects, and a state of each of the candidate objects provided by one or more network devices; and perform the action on the identified target object.

13. The computer system of claim 12, further comprising instructions to:

determine a score for each of the plurality of different candidate objects based on weights applied to the historical association of the term with that candidate object, recent interactions with that candidate object, and the state of that candidate object provided by the network devices; and identify the target object from the plurality of candidate objects based on the score for each of the plurality of different candidate objects.

14. The computer system of claim 12, further comprising instructions to:

store information for a specific object from a prior command in a decaying storage object, wherein the decaying storage object is used to identify the target object, and wherein a time decay for the decaying storage object is based on one or more from a group of:

a recent interaction with a network device referencing the specific object;

a historical frequency of introduction of other similar named objects; and a contextual component of network devices derived from a state of the specific object.

15. A computer program product for performing an action on an object identified from a command, the computer program product comprising one or more computer readable storage media collectively having program instructions embodied therewith, the program instructions executable by a computer to cause the computer to:

analyze a command to perform an action on a target object, wherein the command includes a term for the target object that refers to a plurality of different candidate objects, wherein at least two of the different candidate objects include different physical objects;

identify the target object from the plurality of different candidate objects based on historical associations of the term with specific ones of the candidate objects, recent interactions within a threshold amount of time with the different candidate objects, and a state of each of the candidate objects provided by one or more network devices; and perform the action on the identified target object.

16. The computer program product of claim 15, wherein the command includes a voice command, and the processor implements a virtual agent to perform the action on the target object.

17. The computer program product of claim 16, wherein the plurality of different candidate objects referred to by the term are determined from a decision ontology for the virtual agent.

18. The computer program product of claim 15, wherein the program instructions further cause the computer to:

determine a score for each of the plurality of different candidate objects based on weights applied to the historical association of the term with that candidate object, recent interactions with that candidate object, and the state of that candidate object provided by the network devices; and identify the target object from the plurality of candidate objects based on the score for each of the plurality of different candidate objects.

19. The computer program product of claim 15, wherein the program instructions further cause the computer to:

store information for a specific object from a prior command in a decaying storage object, wherein the decaying storage object is used to identify the target object, and wherein a time decay for the decaying storage object is based on one or more from a group of:

a recent interaction with a network device referencing the specific object;

a historical frequency of introduction of other similar named objects; and a contextual component of network devices derived from a state of the specific object.

20. The computer program product of claim 15, wherein the historical associations include a candidate object with a greatest quantity of commands, and the state of the candidate objects include presence of a conflict between an operational state of the candidate objects and the action to be performed on the target object.

* * * * *